US007305871B2

(12) United States Patent
Arita et al.

(10) Patent No.: US 7,305,871 B2
(45) Date of Patent: Dec. 11, 2007

(54) CYLINDER DISCRIMINATING DEVICE AND METHOD THEREOF, AND ENGINE IGNITION CONTROL DEVICE AND METHOD THEREOF

(75) Inventors: Hiroshi Arita, Hyogo (JP); Takahiro Aki, Hyogo (JP); Takeshi Maenaka, Hyogo (JP)

(73) Assignee: Fujitsu Ten Limited, Kobe (JP)

( * ) Notice: Subject to any disclaimer, the term of this patent is extended or adjusted under 35 U.S.C. 154(b) by 0 days.

(21) Appl. No.: 11/386,791

(22) Filed: Mar. 23, 2006

(65) Prior Publication Data

US 2006/0213262 A1 Sep. 28, 2006

(30) Foreign Application Priority Data

Mar. 24, 2005 (JP) ............................ 2005-086286

(51) Int. Cl.
*G01M 15/00* (2006.01)

(52) U.S. Cl. ............... 73/117.3; 73/118.1; 123/406.11; 123/406.18

(58) Field of Classification Search .......... 73/116–120; 123/406.11–406.76
See application file for complete search history.

(56) References Cited

U.S. PATENT DOCUMENTS 4,169,438 A * 10/1979 Iwase et al. ........... 123/406.63
5,353,635 A * 10/1994 Saiki et al. ................ 73/117.2
6,035,826 A * 3/2000 Matsuoka .............. 123/406.62
6,041,647 A * 3/2000 Matsuoka .................... 73/116
6,341,253 B1 * 1/2002 Honda ........................ 701/102
6,775,611 B2 * 8/2004 Kobayashi et al. ......... 701/114
7,197,391 B2 * 3/2007 Kunibe et al. .............. 701/114

FOREIGN PATENT DOCUMENTS

JP A 6-249021 9/1994
JP A 6-264809 9/1994
JP A 7-109948 4/1995
JP A 2003-049696 2/2003
JP A 2003-184629 7/2003
JP A 2004-108381 4/2004

* cited by examiner

*Primary Examiner*—Andre J. Allen
*Assistant Examiner*—Jermaine Jenkins
(74) *Attorney, Agent, or Firm*—Oliff & Berridge, PLC

(57) ABSTRACT

A cylinder discriminating device includes a cylinder discriminating section. A crank rotor includes first and second non-tooth portions asymmetrically positioned on the crank rotor. The first non-tooth portion is positioned to correspond to a top dead center of a specific cylinder. A crank signal is outputted when each of the plurality of the tooth portions is detected. A cam signal is outputted when a predetermined tooth portion of a cam rotor is detected. And, the cylinder discriminating section discriminates the specific cylinder by detecting the first non-tooth portion based on number of the crank signals detected during a time period from a time when one of the first and second non-tooth portions is detected to a time when the other of the first and second non-tooth portions is detected, and by detecting whether or not the cylinder discriminating section detects the cam signal during the same time period.

12 Claims, 6 Drawing Sheets

CYLINDER DISCRIMINATING DEVICE AND METHOD THEREOF, AND ENGINE IGNITION CONTROL DEVICE AND METHOD THEREOF

BACKGROUND OF THE INVENTION

1. Field of the Invention

The present invention relates to a cylinder discriminating device and the method thereof, including a crank signal detecting section that detects tooth portions of a crank rotor having tooth portions arranged at regular intervals and a pair of asymmetric non-tooth portions on periphery of the crank rotor and generates crank signals in the form of a pulse, a cam signal detecting section that detects a predetermined tooth portion on the periphery of a cam and generates cam signals in the form of a pulse, and a cylinder discriminating section configured such that a detected timing of a specific tooth portion by means of the crank signal detecting section corresponds to a top dead center of a certain cylinder group and discriminates a cylinder on the basis of a cam signal between the non-tooth portions of the crank signal. In addition, it relates to an engine ignition control section and a method thereof, which ignites the fuel of the cylinder discriminated by the cylinder discriminating device.

2. Description of the Related Art

In recent years, an internal combustion engine is electronically controlled and an electronic-control type fuel injection device is popular. In this type of a fuel injection device, the amount of fuel to be supplied to the internal combustion engine is calculated by a microcomputer on the basis of a driving condition and the most suitable amount of the fuel is supplied to the internal combustion engine in consideration as a whole, including fuel efficiency, drivability etc. Meanwhile, when the use of the electronic-control type fuel injection device, the amount of the fuel to be supplied to the internal combustion engine is optimized and fuel injection time can be optionally set. For this reason, the fuel injection time is also varied relative to the related art and an asynchronous fuel injection is often used, which injects the fuel regardless of a crank angle in starting an engine. For example, as disclosed in JP-A-6-249021, when starting an internal combustion engine having a plurality of cylinders, it is determined if the internal combustion engine start easily depending on the system conditions, such as the temperature of cooling water and battery voltage. Only in case where it is determined that the internal combustion engine does not start easily, an asynchronous fuel injection is carried out on the basis of a cylinder discriminating signal for enhancing the start.

The fuel injection timing to each cylinder and ignition timing for burning the injected fuel is obtained from the cylinder discriminating signal, which is composed of two different signals, as disclosed in JP-A-6-249021. In general, as disclosed in JP-A-2003-184629, two sensors are provided, one of them outputs rotational signals at regular intervals according to a rotation of a cam shaft and the other sensor outputs rectangular pulses having different width depending on the cylinder groups when a crankshaft rotates to a predetermined crank angle corresponding to the fuel igniting timing, and the igniting timing that can be discriminated is outputted to each of the cylinders in accordance with the relationship between first cylinder discriminating signals (crank signals), i.e., the rectangular pulses output and second cylinder discriminating signals (cam signals), i.e., the rotational signals output.

As shown in FIG. 5, for example, in a four cylinder internal combustion engine having a first, second, third, and fourth cylinders. The cylinders drive differently in phase by ¼ cycle each other, respectively, a rotor is provided with twenty four tooth portions arranged at regular angles, three non-tooth portions where two tooth portions are sequentially removed is formed, two of the non-tooth portions are formed as sequential-non-tooth portions 4, and a single-non-tooth portion 5 is formed at a half-rotated position from the sequential-non-tooth portion 4. Therefore, a crank rotor 2 having eighteen tooth portion 3*a* to 3*r* (24-6) is fixed to a crankshaft 1. Similarly, a cam rotor 12 is provide with tooth portions 13*a*, 13*b* with an angle corresponding to the crank angle 180° CA (Crank Angle) and fixed to a cam shaft 11. As shown in FIG. 4, pulse signals (crank signals) corresponding to the tooth portions 3*a* to 3*r* of the crank rotor 2 and pulse signals (cam signals) corresponding to the tooth portions 13*a* and 13*b* of the cam rotor 12 are detected. When the sequential-non-tooth portion 4 or the single-non-tooth portion 5 is detected in the crank signals, it is discriminated which cylinder in the internal combustion engine is at its top dead center compression depending on whether a cam signal is in existence, within a predetermined period before the detecting the non-tooth portions, that is, at a predetermined counted crank signal k. The fuel ignition timing is determined through the above procedures.

SUMMARY OF THE INVENTION

However, in initial explosion control in the related art, a timing when it is determined that which cylinder in the internal combustion engine reaches a top dead center compression for a first time from cranking, is discriminated at the same timing when the cylinder reaches the top dead center. Therefore, if fuel is ignited in the above state, the fuel ignition timing is later than expected, thus causing starting performance of the internal combustion engine unstable.

Further, the fuel ignition is not carried out for the cylinder that has reached at the top dead center compression for the first time. The amount of time from the discrimination of the cylinder having reached the top dead center compression for the first time is counted on the basis of crank signals, and the fuel ignition is sequentially and securely carried out from a cylinder after the discriminated cylinder having reached the top dead center compression for the first time. It has become an issue to improve the starting performance of an internal combustion engine.

The present invention has been made in view of above circumstances and provides a cylinder discrimination device and method thereof, and an engine ignition control device and method thereof.

According to an aspect of the invention, a smooth starting performance in an internal combustion engine is achieved.

According to a first aspect of the invention, there is provided a cylinder discriminating device including: a cylinder discriminating section. A crank rotor includes a plurality of tooth portions arranged at regular intervals and first and second non-tooth portions asymmetrically positioned on a periphery of the crank rotor. The first non-tooth portion is positioned to correspond to a top dead center of a specific cylinder of an engine. A crank signal is outputted when the cylinder discriminating section detects each of the plurality of the tooth portions. A cam signal is outputted when the cylinder discriminating section detects a predetermined tooth portion on a periphery of a cam rotor. The cylinder discriminating section discriminates the specific cylinder by detecting the first non-tooth portion based on number of the crank signals detected during a time period from a time when one of the first and second non-tooth portions is detected to a time when the other of the first and second non-tooth portions is detected, and by detecting whether or not the cylinder discriminating section detects the cam signal during the same time period.

According to the above configuration, since the number of pulses between the non-tooth portions asymmetrically formed on the crank rotor, that is, the number of pulses in crank signals detected at a second interval from the first non-tooth portion to the second non-tooth portion in the two non-tooth portions are different from that detected at a first interval from the second non-tooth portion to the first non-tooth portion. For example, in case of counting the number of pulses at the first interval from the second non-tooth portion to the first non-tooth portion where more pulses are detected than at the second interval, it can be determined that the first interval corresponds to a crank angle when the counted pulse exceeds that at the second interval, and before the first non-tooth portion is detected at the second interval, a detected timing the second non-tooth portion is predictable. Further, when a specific cylinder group is at a top dead center at a predetermined crank angle corresponding to a detected timing of the first non-tooth portion at the second interval, a cylinder group where fuel is, for the first time, to be ignited by an initial explosion control can be discriminated on the basis of the number of pulses in the crank signals from the second non-tooth portion before it reaches a top dead center. Also, by discriminating a cylinder on the basis of a cam signal, a cylinder for fuel ignition for the first time by an initial explosion control, i.e., the reach of a top dead center compression for the first time can be discriminated before it reaches there.

In addition to the first aspect, according to a second aspect of the invention, distances between each two tooth portions adjacent to the first and second non-tooth portions are different.

According to the above mentioned configuration, the cylinder discriminating device can also discriminate a next cylinder to be fuel ignited with ease after the initial explosion control, in order that the two non-tooth portions are easily discriminated.

In addition to the second aspect, according to a third aspect of the invention, the distance between the two tooth portion adjacent to the first non-tooth portion is larger than the distance of the second non-tooth portion; and when one of the two adjacent tooth portions, which is located on downstream of the first non-tooth portion in a rotation direction of the crank rotor, the specific cylinder is located at the top dead center.

For example, in case the first non-tooth portion is a sequential-non-tooth portion at the first interval, detection of the sequential-non-tooth portion is predictable before its detection timing. In other words, a timing the specific cylinder group reaches a top dead center can be discriminated with ease before the detection timing of the sequential-non-tooth portion. Also, by discriminating a cylinder on the basis of the cam signal, it is possible to discriminate in advance a timing a certain cylinder of the specific cylinder group is at a top dead center compression.

According to a fourth aspect of the invention, there is provided a cylinder discriminating device of an engine. The engine includes a crank rotor including a plurality of tooth portions arranged at regular intervals, and first and second non-tooth portions asymmetrically positioned on a periphery of the crank rotor, wherein the first non-tooth portion is positioned to correspond to a top dead center of a specific cylinder; and a cam rotor including a tooth portion on a periphery of the cam rotor, which is positioned to correspond to a predetermined interval between the first and second non-tooth portions of the crank rotor. The cylinder discriminating device includes a cylinder discriminating section that discriminates the specific cylinder by detecting the first non-tooth portion based on number of the tooth portions of the crank rotor detected by the cylinder discriminating section and by detecting whether or not the cylinder discriminating section detects the tooth portion of the cam rotor during a predetermined time period.

According to a fifth aspect of the invention, there is provided an engine ignition control device according to the cylinder discriminating device as recited above, and a fuel ignition control section that ignites the fuel in the cylinder discriminated by the cylinder discriminating device.

According to a sixth aspect of the invention, there is provided a cylinder discriminating method including discriminating a specific cylinder of an engine. A crank rotor includes a plurality of tooth portions arranged at regular intervals, and first and second non-tooth portions asymmetrically positioned on a periphery of the crank rotor. The first non-tooth portion is positioned to correspond to a top dead center of the specific cylinder. A crank signal is outputted when the cylinder discriminating section detects each of the plurality of the tooth portions. A cam signal is outputted when the cylinder discriminating section detects a predetermined tooth portion on a periphery of a cam rotor. The specific cylinder is discriminated by detecting the first non-tooth portion based on number of the crank signals detected during a time period from a time when one of the first and second non-tooth portions is detected to a time when the other of the first and second non-tooth portions is detected, and by detecting whether or not the cylinder discriminating section detects the cam signal during the same time period.

In addition to the method, according to another aspect of the invention, distances between each two tooth portions adjacent to the first and second non-tooth portion are different.

In addition to the method, according to still another aspect of the invention, the distance between the two tooth portion adjacent to the first non-tooth portion is larger than the distance of the second non-tooth portion; and when one of the two adjacent tooth portions, which is located on downstream of the first non-tooth portion in a rotation direction of the crank rotor, the specific cylinder is located at the top dead center.

According to the aspect of the invention, a cylinder discriminating method of an engine includes a crank rotor having a plurality of tooth portions at regular intervals and a pair of non-tooth portions asymmetrically positioned on the periphery, of which at least one non-tooth portion is positioned to correspond to a top dead center of a specific cylinder and a cam rotor having tooth portions on the periphery to correspond to an interval between predetermined non-tooth portions of the crank rotor. In this case, the method includes discriminating the specific cylinder by detecting a tooth portion at a predetermined position corresponding to its top dead center on the basis of whether a tooth portion of the cam rotor is in existence and the number of tooth portions of the crank rotor after detection of the non-tooth portion of the crank rotor, in case the non-tooth portion of the crank rotor is detected.

According to an aspect of the invention, there is provided an engine ignition control method including igniting the fuel in the cylinder discriminated by the above mentioned cylinder discriminating method.

According to the above configuration, there is provided a cylinder discriminating device and method thereof, or an engine ignition control device and method thereof, which improves the starting performance of the internal combustion engine.

DETAILED DESCRIPTION OF THE INVENTION

Figure 1:
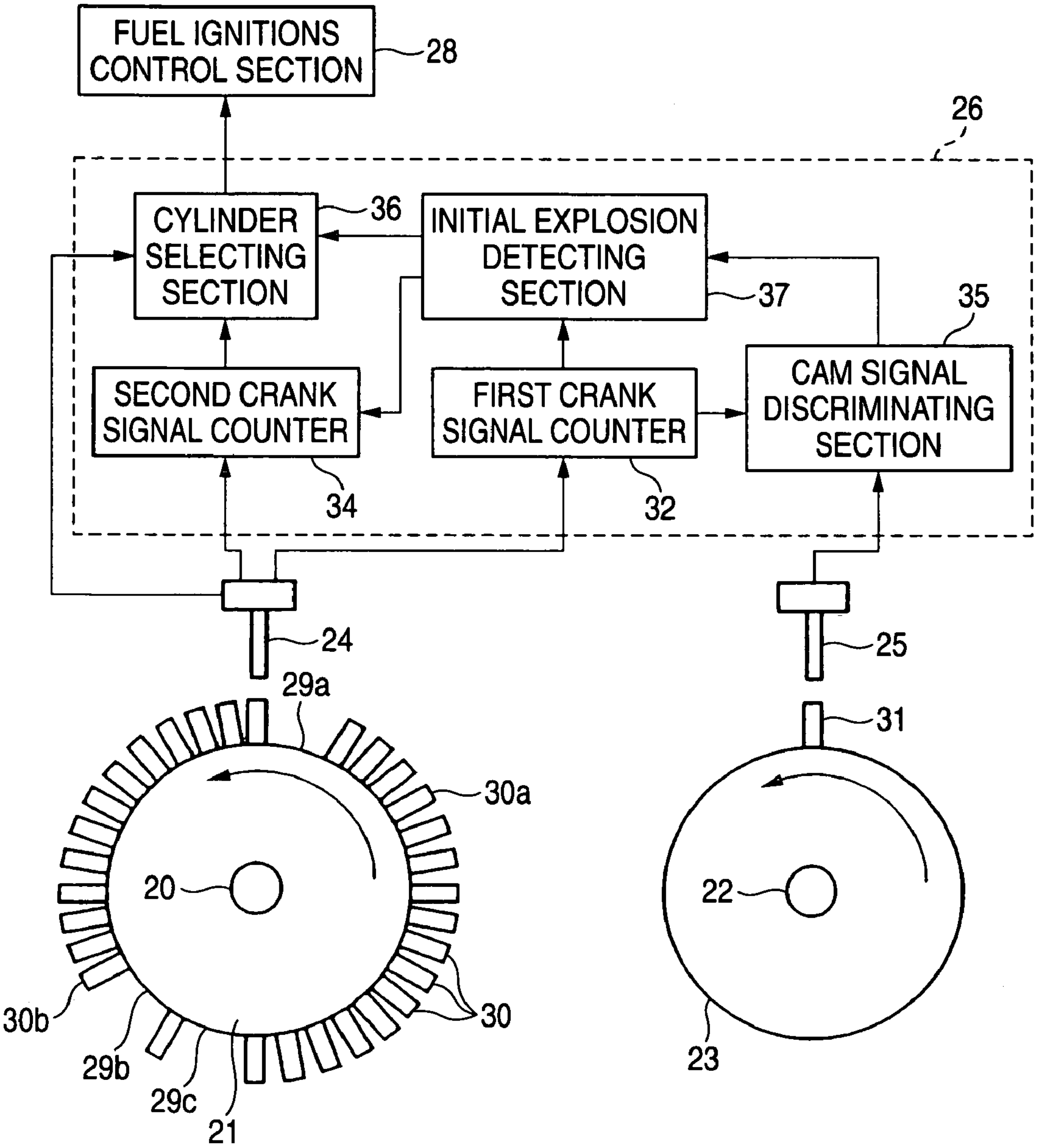
FIG. 1 is a schematic view of a cylinder discriminating device or engine ignition device according to an embodiment.

An application is described below, where a cylinder discriminating device or an engine ignition control device is applied to an internal combustion engine with a four-stroke cycle. The internal combustion engine has a first, second, third, and fourth cylinders which are driven with ¼ phase difference in a cycle. The first and fourth cylinders are grouped together as a first cylinder group and simultaneously reach respective top dead centers. The second and third cylinders are also grouped together as a second cylinder group and simultaneously reach respective top dead centers. In other words, the first and second cylinder groups are driven with ½ phase difference in a cycle and sequentially reach the respective top dead centers in the order of the first, second, third, fourth, and first cylinders. Further, in a fuel injection control, the fuel is asynchronously injected into the all cylinders when a starter is initially driven, and then synchronously injected after discrimination of the cylinders (described later). As shown in FIG. 1, the cylinder discriminating device or an engine ignition control device includes a crank rotor 21 fixed to a crankshaft 20 in an internal combustion engine and rotating in an arrow direction, a cam rotor 23 fixed to a cam shaft 22 in the internal combustion engine with four cylinders, a crank signal detecting section 24 positioned near the crank rotor 21 and detecting the crank signal from it, a cam signal detecting section 25 positioned near the cam rotor 23 and detecting the cam signal from it, a cylinder discriminating section 26 discriminating cylinders on the basis of crank signal and the cam signal, and a fuel ignition control section igniting the fuel in the discriminated cylinder at a preset timing.

In other words, the cylinder discriminating device is composed of a crank rotor 21, cam rotor 23, crank signal detecting section 24, cam signal detecting section 25, and cylinder discriminating section 26, and engine ignition control device is composed of a crank rotor 21, cam rotor 23, crank signal detecting section 24, cam signal detecting section 25, cylinder discriminating section 26, and fuel ignition control section 28.

The crank rotor 21 is for generating the crank signal as a first indicating signal about the cycle condition of each cylinder in the four-cylinder internal combustion engine. Tooth portion 30, for example, thirty six tooth portions arranged at regular intervals, i.e., 10° CA intervals, are provided on the periphery of the crank rotor 21. When the crankshaft 20 rotates to the crank angle corresponding to a top dead centers of the second cylinder group, that is, of the second and third cylinders (hereinafter, 'TDC 2' and 'TDC 3' refer to the timings for the second and third cylinders at the top dead center, respectively), a predetermined number of the tooth portions are not provided on a portion that is positioned four or five tooth portions ahead from a tooth portion 30*a* facing the crank signal detection section 24 in a rotational direction of the crankshaft 20, and defines a non-tooth portion 29*a*. Also, the crankshaft 20 rotates to a crank angle corresponding to the top dead centers of the first cylinder group, that is, of the first and fourth cylinders (hereinafter, 'TDC 1' and 'TDC 4' refer to the timing for the first and third cylinders at the top dead center, respectively), a predetermined number of the tooth portions are not provided on a portion that is positioned one, two, four or five tooth portions ahead from a tooth portion 30*b* facing the crank signal detecting section 24, and defines non-tooth portions 29*b* and 29*c*. Therefore, the crank rotor 21 has thirty tooth portions 30 on the periphery.

The cam rotor 23 is for generating the cam signal as a second indicating signal about the cycle condition of each cylinder in the four-cylinder internal combustion engine. A tooth portion 31 consisting of one tooth portion is formed on the periphery of the cam rotor 23. When the cam shaft 22 rotates to the TDC 1, particularly to the top dead center compression of the first cylinder, the tooth portion 31 is positioned, for example 90° CA ahead in a rotational direction from the periphery of the cam rotor facing the cam signal detecting section 25.

The crank signal detecting section 24 is consist of an electromagnetic pick-up type detector and detects the tooth portions 30 provided on the crank rotor 21 as crank signal. The crank signals are detected as pulse signals every time the tooth portions 30 provided on the crank rotor 21 face the crank signal detecting section 24 and detected as pulse signals corresponding to patterns of the provided tooth portions 30 shown in FIGS. 2 and 3. In other words, the pulse signals generated at 10° CA intervals is detected as pulse signals where a single-signal-lack timing and a sequential-signal-lack timing alternately take place at 180° CA intervals. At the single-signal-lack timing, certain number of pulse signals is not generated once at 180° CA intervals and at the sequential-signal-lack timing, certain number of pulse signals are not generated twice successively at 180° CA intervals. In addition, the pulse signals generated at 10° CA intervals are detected as pulse signals including 16 pulses from the single-signal-lack timing to the sequential-signal-lack timing, also 13 pulses from the sequential-signal-lack timing to the single-signal-lack timing.

In other words, the crank signal detecting section 24 detects the tooth portions 30 on the crank rotor 21 and generates pulse signals, and the crank rotor 21 is provided with the plurality of tooth portions 30 at regular intervals and a pair of non-tooth portions asymmetrically positioned, on its periphery.

The cam signal detecting section 25 is consist of an electromagnetic pick-up type detector and detects the tooth portions 31 provided on the cam rotor 23 as the cam signal. The cam signals are detected as pulse signals every time the tooth portions 31 provided on the cam rotor 23 face the cam signal detecting section 25 and detected as pulse signals corresponding to a pattern of the provided tooth portion 31 shown in FIGS. 2 and 3. In other words, the cam signals are detected as pulse signals generated once at 720° CA.

In case a pulse signal in the cam signal is generated between the single-signal-lack timing and the sequential-signal-lack timing in the crank signal, the first cylinder is designed to reach the top dead center compression immediately after the sequential-signal-lack timing. Also, in case a pulse signal in the cam signal is not generated between the single-signal-lack timing and the sequential-signal-lack timing in the crank signal, the fourth cylinder is designed to reach the top dead center compression immediately after the sequential-signal-lack timing.

As shown in FIG. 1, the cylinder discriminating section 26 is for discriminating discriminate a top dead center compression of a certain cylinder on the basis of the crank signals and the cam signals. The cylinder discriminating section 26 includes a first crank signal counter 32 that counts crank signal pulses as a first counted value j, a second crank signal counter 34 that counts crank signal pulses as a second counted value k, a cam signal discrimination section 35 that discriminates whether a cam signal is generated, an initial explosion cylinder detecting section 37 that detects a cylinder for an initial fuel ignition under an initial explosion control, and a cylinder selecting portion 36 that sequentially selects a cylinder for next fuel ignition after the initial fuel ignition of the cylinder under the initial explosion control.

Figure 2:
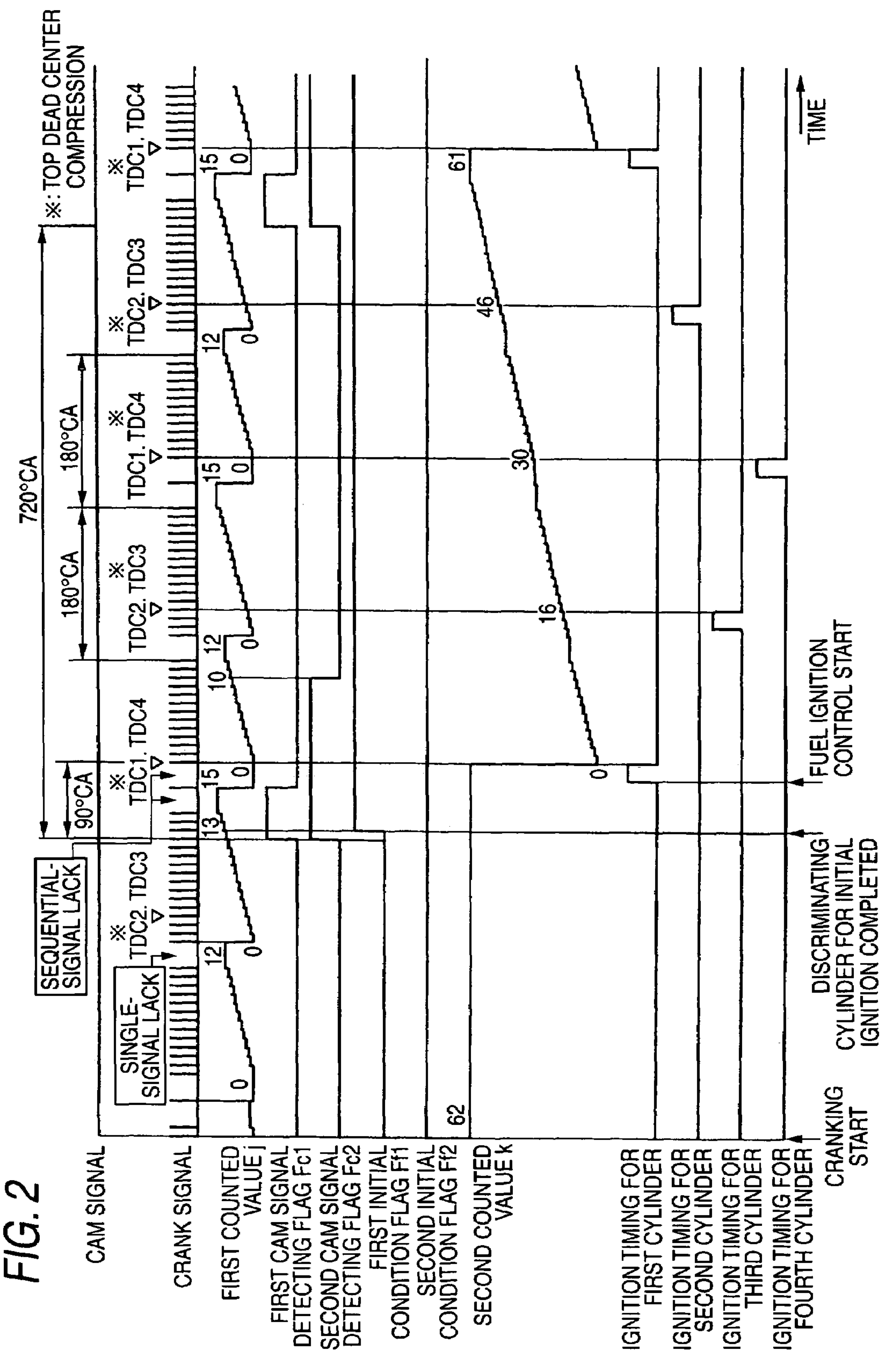
FIG. 2 is a timing chart for explaining generating timings of signals, a timing of initial explosion cylinder discriminating, and a starting timing of fuel injection control according to the embodiment.
Figure 3:
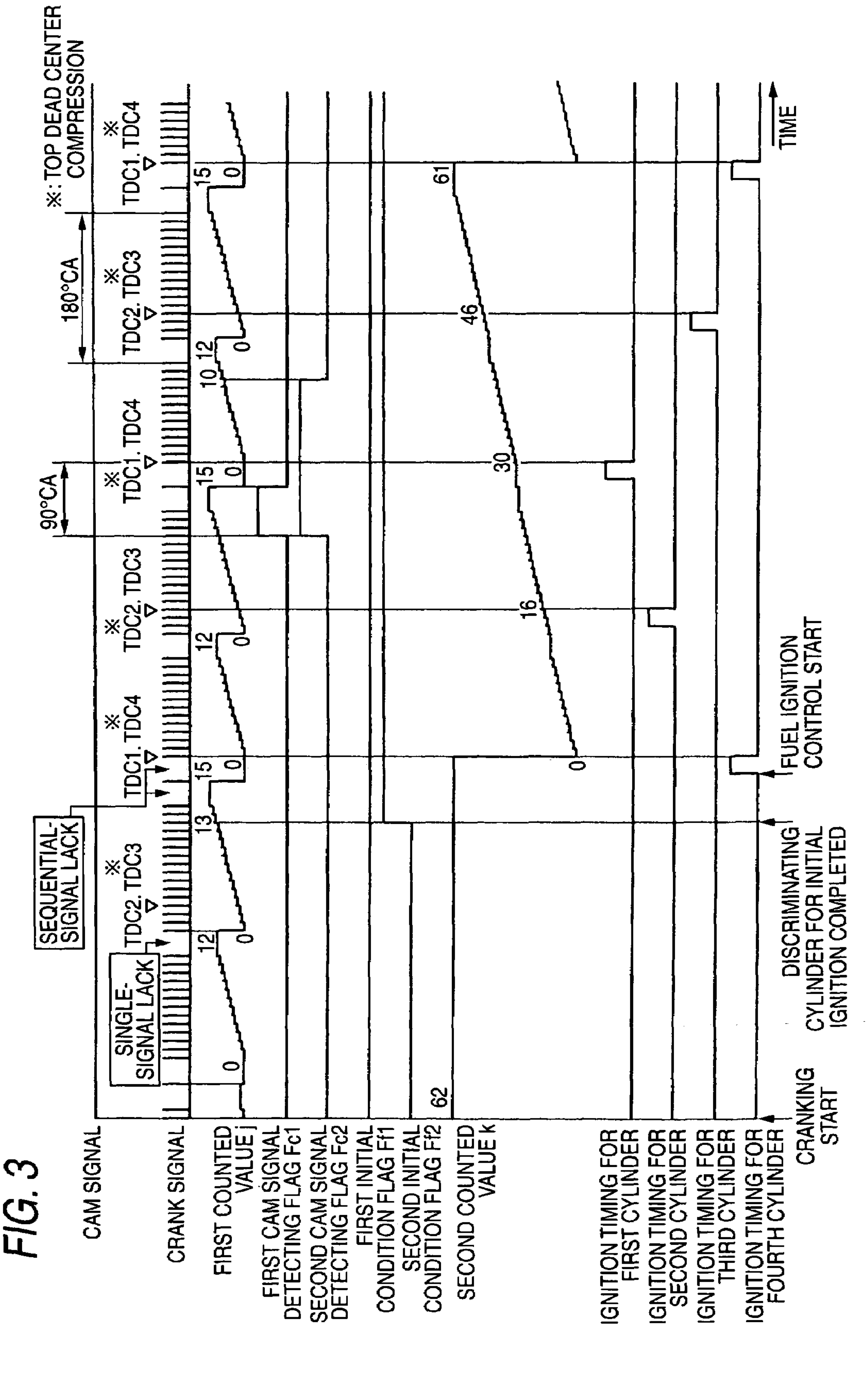
FIG. 3 is a timing chart for explaining generating timings of signals, a timing of initial explosion cylinder discriminating, and a starting timing of fuel injection control according to the embodiment.

As shown in FIGS. 2 and 3, the crank signal counter 32 resets the first counted value j when the single-signal-lack timing or the sequential-signal-lack timing is detected in the crank signal, thereafter, counts pulses in the crank signal. In other words, the first crank signal detecting section 32 resets the first counted value j at the pulse signal when the sequential-signal-lack timing is detected. The first crank signal detecting section 32 counts a maximum of 12 pulses from the detection of the sequential-signal-lack timing to the detection of the single-signal-lack timing. In addition, the first crank signal detecting section 32 resets the first counted value j at the pulse signal when the single-signal-lack timing is detected. The first crank signal detecting section 32 counts a maximum of 15 pulses from the detection of the single-signal-lack timing to the detection of the sequential-signal-lack timing. In a mid-pulse at the sequential-signal-lack timing, detecting errors of the first counted value j may be preferably prevented by resetting the first counted value j at the pulse signal in the detecting of the single-signal-lack timing. Therefore, it is preferable to reset the first counted value j at the detection of any lack timing, regardless of the single- or sequential-lack of pulse signal in the crank signal.

As shown in FIGS. 2 and 3, the cam signal discrimination section 35 sets a first cam signal detecting flag Fc1 when a cam signal is detected, and resets that when the first counted value j is reset, and then discriminates whether a pulse in the cam signal is detected from the single-signal-lack timing to the sequential-signal-lack timing in the crank signal, or from the sequential-signal-lack timing to the single-signal-lack timing. In addition, the cam signal discrimination section 35 sets a second cam signal detecting flag Fc2 when a cam signal is detected, and resets that when the first counted value j is a predetermined value Af (described below), for example 10.

The second cam signal detecting flag Fc2 is employed for determining of a reset timing of the second counted value k by a second crank signal counter 34 (described below).

The initial explosion cylinder detecting section 37 detects a cylinder for fuel ignition under the initial explosion control on the basis of the first counted value j detected by the first crank signal counter 32 and the first cam signal detecting flag Fc1 set by the cam signal discrimination section 35. As shown in FIGS. 2 and 3, for example, when the first counted value exceeds 12, it is determined that present timing is in the interval from the single-signal-lack timing to the sequential-signal-lack timing, and then the TDC 1 or TDC 4 is detected when a following sequential-signal-lack timing is detected. In addition, when the first counted value j exceeds 12, i.e., the value j is 13, 14, or 15, it can be discriminated that one of the first and fourth cylinders has reached the top dead center compression depending whether the first cam signal detecting flag Fc1 is set. In case the first cylinder has reached the top dead center compression, a first initial condition flag Ff1 is set when the reaching is discriminated, as shown in FIG. 2. On the other hand, in case the fourth cylinder has reached the top dead center compression, a second initial condition flag Ff2 is set when the reaching is discriminated, as shown in FIG. 3. When the first initial condition flag Ff1 is set, the second initial condition flag Ff2 is not, and vice versa.

As shown in FIGS. 2 and 3, the second crank signal counter 34 resets the second counted value k when a pulse is detected immediately after the sequential-signal-lack timing in the crank signal and counts the pulses until two sequential-signal-lack timing is detected from the sequential-signal-lack timing, in order to measure a timing for sequential fuel ignition of the cylinders after the initial ignition takes place in the cylinder under the initial explosion control. In this regard, the countering is based on one cycle of every 720° CA, therefore, correspond values may be set, which corresponds to the timing for the fuel ignition of each of the cylinder.

The second counted value k until a first sequential-signal-lack timing is detected is set to an initial counted value Mf of a value exceeding the number of pulses until two sequential-signal-lack timings from the sequential-signal-lack timing of the crank signal, for example, k=Mf=62. In other words, the second crank signal counter 34 holds the second counted value to Mf until a sequential-signal-lack timing is, for the first time, detected after the first initial condition flag Ff1 or second initial condition flag Ff2 is set by means of the initial explosion cylinder detecting section 37, thereafter, resets the second counted value k when a sequential-signal-lack timing is detected, for the first time. The second crank signal counter 34 counts pulses in the crank signal after the resetting.

A resetting timing of the second counted value k other than k=Mf depends on the second cam signal detecting flag Fc2. In other words, in case the first initial condition flag Ff1 is set, the second counted value k is reset when a sequential-signal-lack timing is detected in the crank signal with the Fc2 set, and not reset when a sequential-signal-lack timing is not detected in case the crank signal with the second cam signal detecting flag Fc2 reset. In addition, the second initial condition flag Ff2 is set, the second counted value k is reset when a sequential-signal-lack timing in the crank signal is detected with the Fc2 reset, and not reset when a sequential-signal-lack timing in the crank signal is detected with the second cam signal detecting flag Fc2 set. Accordingly, in case a predetermined value Af of the first counted value j for resetting the second cam signal detecting flag Fc2 is set to range from 0 to the first counted value j when a pulse signal in the cam signal is detected, the value Af is set so that the setting and resetting states of the second cam signal detecting flag Fc2 is alternately repeated.

In addition to selecting a cylinder for fuel ignition discriminated by means of the initial explosion cylinder detecting section 37 according to the initial explosion control in order that the fuel is ignited in each of the cylinders at the top dead center compression through the fuel ignition control section 28, the cylinder selecting portion 36 sequentially selects a cylinder for an ignition after the first ignited cylinder by means of the initial explosion control on the basis of the second counted value k from the second crank signal counter 34. For example, in case the second counted value k is 62 or more, the cylinder selecting portion 36 selects a cylinder for fuel ignition by the initial explosion control detected by the initial explosion cylinder detecting section 37 so that the fuel in the selected cylinder is ignited by the fuel ignition control section 28 at a predetermined timing until the second counted value k is reset, that is, a sequential-signal-lack timing is detected for the first time after the first initial condition flag Ff1 or second initial condition flag Ff2 is set. Also, in case the second counted value k is 61 or less and the first initial condition flag Ff1 is set, the cylinder selecting portion 36 selects the cylinders so that the fuel of the first, third, fourth, and second cylinders are sequentially ignited by means of the fuel ignition control section 28 at a predetermined timings until the second counted value k is 0, 16, 30, and 46, respectively, on the basis of the second counted value k, as shown in FIG. 2. Furthermore, in case the second counted value k is 61 or less and the second initial condition flag Ff2 is set, the cylinder selecting portion 36 selects the cylinders so that the fuel of the fourth, second, first, and third cylinders are sequentially ignited by means of the fuel ignition control section 28 at a predetermined timings until the second counted value k is 0, 16, 30, and 46, respectively, on the basis of the second counted value k, as shown in FIG. 3.

Figure 4:
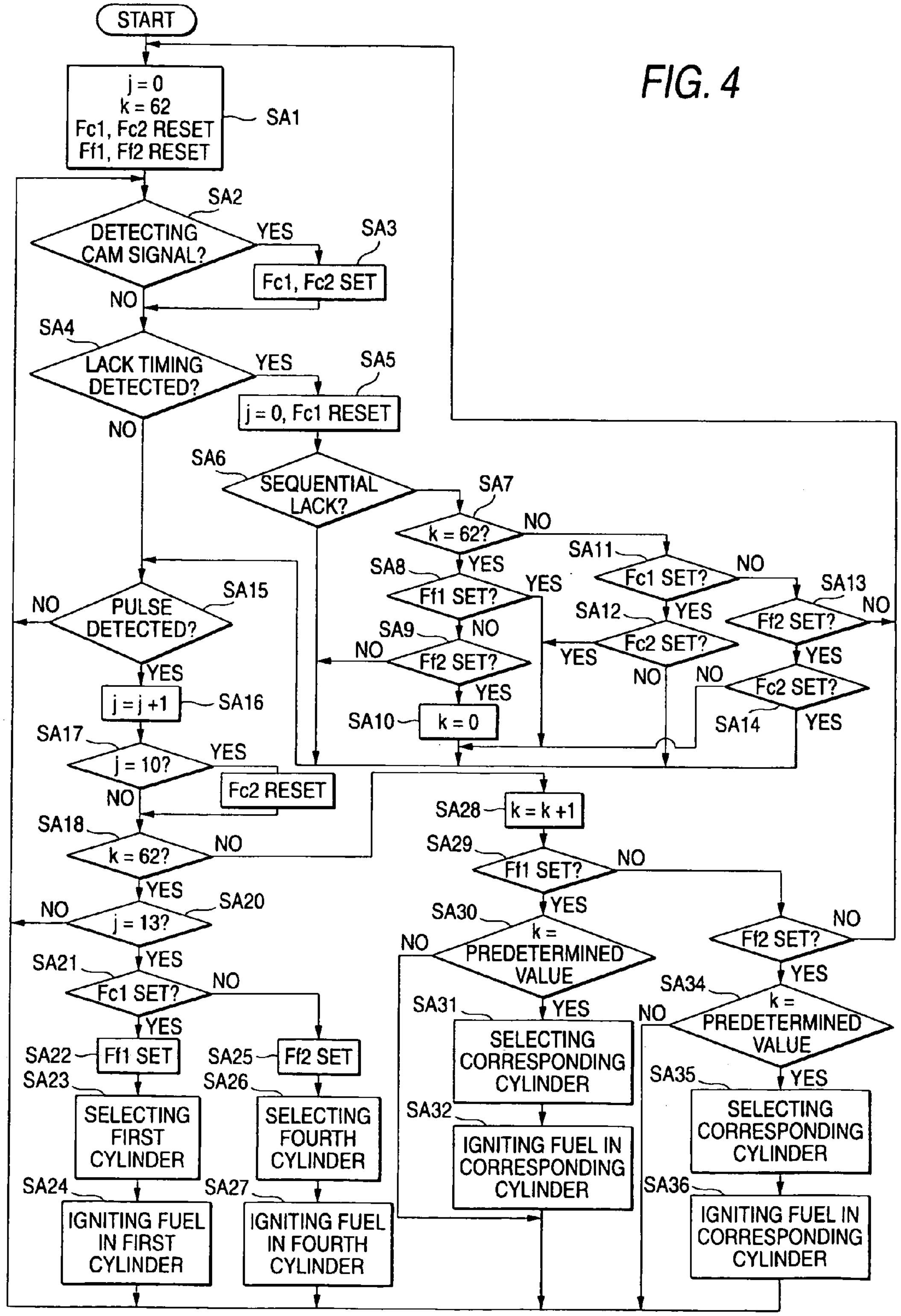
FIG. 4 is a flow chart illustrating an operation discriminating a cylinder for a fuel injection under an initial explosion control in a cylinder discriminating device or an engine ignition device according to the embodiment.
Figure 5:
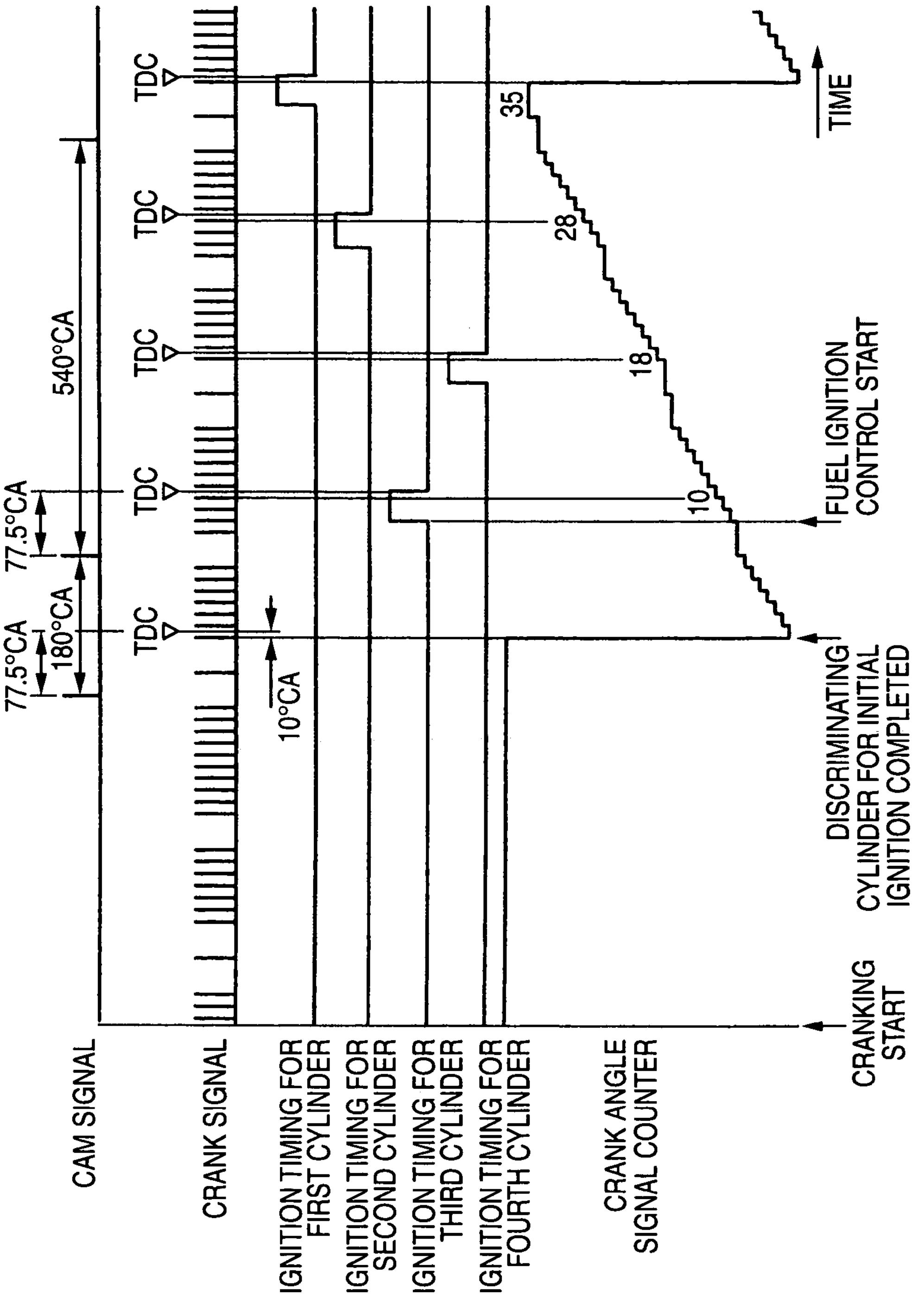
FIG. 5 is a timing chart for explaining a timing of initial explosion cylinder discriminating, and a starting timing of fuel injection control in related art.
Figure 6:
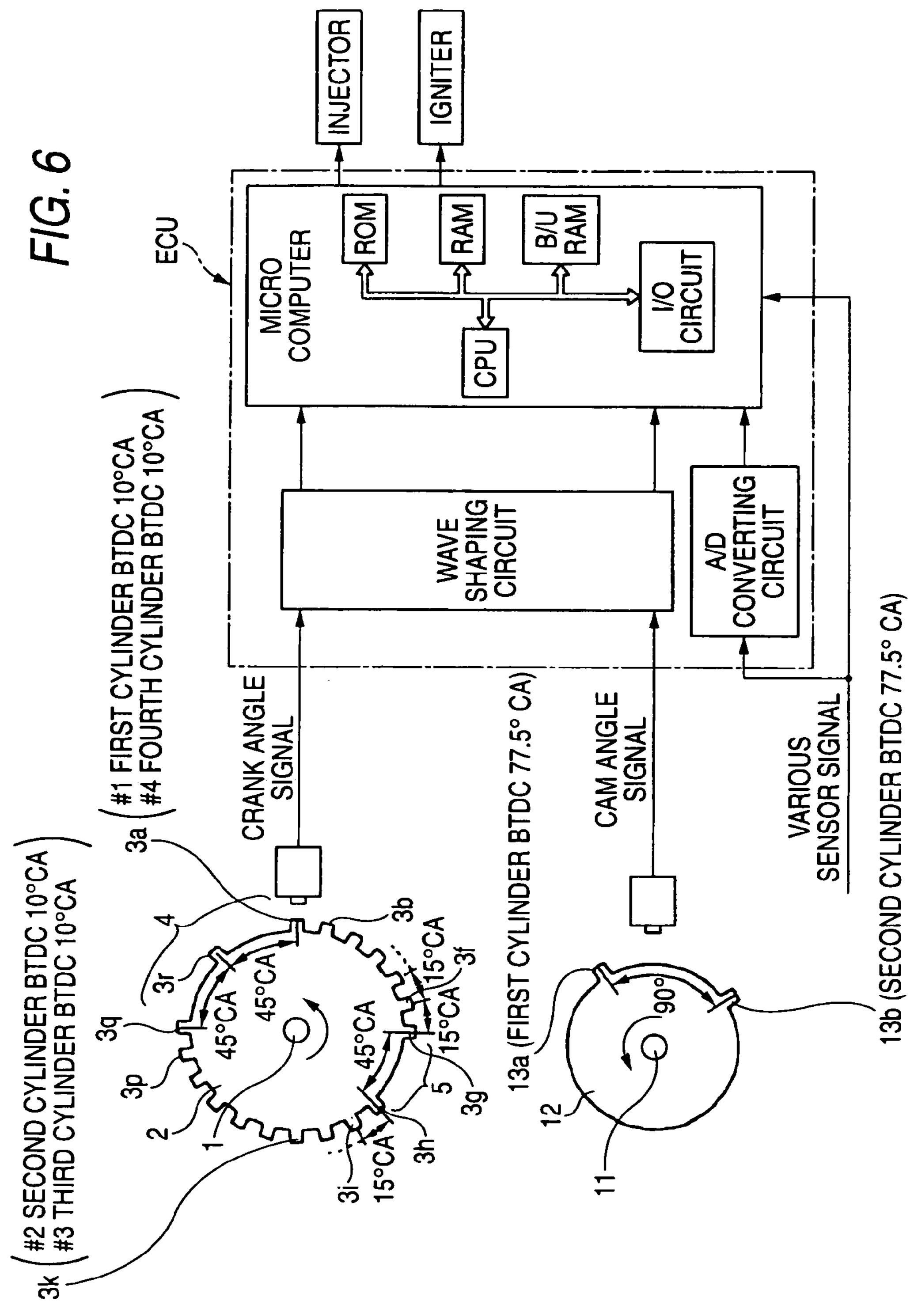
FIG. 6 is a schematic view of a cylinder discriminating device in related art.

Discriminating of a cylinder for fuel ignition and a fuel ignition operation by means of the cylinder discriminating device and an engine ignition control device are described below in reference to the flow chart in FIG. 4. When an internal combustion engine is cranked by starting the ignition switch, and the crank signal detecting section 24 and the cam signal detecting section 25 start detecting the crank signal and cam signal, respectively, the first crank signal counter 32 resets the first counted value j into 0, the second crank signal counter 34 set the second counted value k into initial value k, for example 62, the cam signal discrimination section 35 resets the first and second cam signal detecting flags Fc1 and Fc2, and the initial explosion cylinder detecting section 37 resets the first and second initial condition flags Ff1 ad Ff2 (SA 1).

When the cam signal detecting section 25 detects a cam signal (SA 2), the cam signal discrimination section 35 resets the first and second cam signal detecting flags Fc1 and Fc2 (SA 3).

When crank signal detecting section 24 detects a single or sequential-signal-lack timing (SA 4), the first crank signal counter 32 resets the first counted value j into 0 and the cam signal discrimination section 35 resets the first cam signal detecting flag Fc1 (SA 5).

In case a signal detected by means of the crank signal detecting section 24 is a sequential-signal-lack timing (SA 6), when the second counted value k is 62 (SA 7) and the first initial condition flag Ff1 is set (SA 8) or second initial condition flag Ff2 is set (SA 9), the second crank signal counter 34 resets the second counted value k into 0 (SA 10). When the second counted value k is not 62, i.e., 61 or less (SA 7), the first initial condition flag Ff1 is set (SA 11) and the second signal detecting flag Fc2 is set (SA 12), the second counted value k is also reset into 0 (SA 10). Furthermore, when the first initial condition flag Ff1 is not set (SA 11), instead, the second initial condition flag Ff2 is set (SA 13), and the second cam signal detecting flag Fc2 is not set, i.e., not reset (SA 14), the second counted value k is reset into 0 (SA 10).

The first crank signal counter 32 increments the first counted value j (SA 16) when the crank signal detecting section 24 detects a pulse in the crank signal (SA 15).

The cam signal detecting section 35 resets the first counted value j into 0 (SA 18), when the first counted value is a predetermined value Af, for example 10 (SA 17).

When the second counted value k is an initial value Mf, i.e., 62, the cylinder selecting section 36 determines that it is not completed to discriminate a cylinder for a fuel ignition by means of the initial explosion control (SA 19), detects a cylinder for the fuel ignition through the initial explosion control by means of the initial explosion cylinder detecting section 37, and then selects the detected cylinder.

In other words, the initial explosion cylinder detecting section 37 is kept on standby until the first counted value j becomes 13, which is the number of pulses in the crank signal counted by the first crank signal counter 32 (SA 20) and then checks the first cam signal detecting flag Fc1 that is set by the cam signal discrimination section 35 (SA 21). When the first cam signal detecting flag Fc1 is set, the first cylinder is detected and discriminated as a cylinder for the fuel ignition by means of the initial explosion control, and the first initial condition flag Ff1 is set (SA 22). The cylinder select section 36 selects the first cylinder as a cylinder, which is detected by the initial explosion cylinder detecting section 37, for the fuel ignition by means of the initial explosion control at the preset timing until a sequential-signal-lack timing is detected, in order that the fuel in the selected first cylinder is ignited by means of the fuel ignition control section 28 (SA 23), which, in turn, ignites the fuel in the selected first cylinder (SA 24).

The initial explosion cylinder detecting section 37 checks the first cam signal detecting flag Fc1 that is set by means of the cam signal discrimination section 35 (SA 21). In case the first cam signal detecting flag Fc1 is not set, i.e., reset, the fourth cylinder is detected and discriminated as a cylinder for the fuel ignition by means of the initial explosion control and then the second initial condition flag Ff2 is set (SA 25). The cylinder select section 36 selects the fourth cylinder as a cylinder, which is detected by the initial explosion cylinder detecting section 37, for the fuel ignition by means of the initial explosion control at the preset timing until a sequential-signal-lack timing is detected, in order that the fuel in the selected fourth cylinder is ignited by means of the fuel ignition control section 28 (SA 26), which in turn ignites the fuel in the selected fourth cylinder (SA 27).

In the step SA 19, when the second counted value k is not 62, i.e., 61 or less, which is counted by the second crank signal counter 34, the cylinder selecting section 36 determines that it is completed to discriminate a cylinder for a fuel ignition by means of the initial explosion control (SA 19) and the second crank signal counter 34 increments the second counted value k (SA 28).

In case the first initial condition flag Ff1 is set by the initial explosion cylinder detecting section 37(SA 29), the cylinder selecting section 36 selects a cylinder for a fuel ignition in accordance with the second counted value k (SA 31) when the second counted value k is a predetermined value, in which case the first initial condition flag Ff1 is set (SA 30). In other words, the cylinder selecting section 36 selects the cylinders so that the fuel of the first, third, fourth, and second cylinders are sequentially ignited by means of the fuel ignition control section 28 at a predetermined timings until the second counted value k is 0, 16, 30, and 46, respectively, on the basis of the second counted value k, and the fuel ignition control section 28 ignites the fuel of the selected cylinders (SA 32).

Further, in case the second initial condition flag Ff2 is set by means of the initial explosion cylinder detecting section 37 (SA 33), the cylinder selecting section 36 selects a cylinder for a fuel ignition in accordance with the second counted value k (SA 35) when the second counted value k is a predetermined value, in which case the second initial condition flag Ff2 is set (SA 34). In other words, the cylinder selecting section 36 selects the cylinders so that the fuel of the fourth, second, first, and third cylinders are sequentially ignited by means of the fuel ignition control section 28 at a predetermined timings until the second counted value k is 0, 16, 30, and 46, respectively, on the basis of the second counted value k, and the fuel ignition control section 28 ignites the fuel of the selected cylinders (SA 36).

In the conventional initial explosion control, when it is discriminated, for the first time, that a cylinder is at a top dead center compression, because the cylinder already has reached the top dead center compression, it misses the fuel ignition timing, and thus the fuel ignition control starts from a next cylinder at the top dead center. However, in the present embodiment, when it is discriminated for the first time that a cylinder is at a top dead center compression, because the cylinder has not reached yet the top dead center compression, fuel ignition control may start from the discriminated cylinder, thereby obtaining a smooth initial explosion.

Other embodiments are described below. The cylinder discriminating and ignition timing detecting algorithms in the above mentioned embodiment are just illustrative examples, and thus another algorithm may also be employed.

In addition, in the above mentioned embodiment, a pair of non-tooth portions is described, which is composed of a single-non-tooth portion where tooth portions are not formed at a region of a tooth portion and a sequential-non-tooth portion including two non-tooth portion that are positioned close to each other at different regions from the single-non-tooth portion, and a tooth portion is positioned between them. However, the present invention is not limited to the above embodiment, a pair of asymmetry non-tooth portions may be formed on the periphery of a crank rotor.

The initial explosion control method and device of the internal combustion engine according to the present invention is available to an internal combustion engine that asynchronously controls injection, however, it is also available to an internal combustion engine that synchronously controls injection.

Moreover, the invention is applicable to an internal combustion engine system for improved starting performance, using another method, for example, to an internal combustion engine, in which an internal combustion engine is operated by obtaining power from a driving wheel in running through a switching mechanism, a piston stops close to a top dead center with fuel injected, by adjusting a crank angle to a preset angle, and after the internal combustion engine stops, a power stroke may be rapidly carried out in restarting. In this regard, a control of rapid starting can be obtained more stably.

The above mentioned embodiment is just an example and respective blocks may be modified in the range of improving the effect of the invention.

The entire disclosure of Japanese Patent Application No. 2005-086286 filed on Mar. 24, 2005 including specification, claims, drawings and abstract is incorporated herein be reference in its entirety.

What is claimed is:

1. A cylinder discriminating device comprising:

a cylinder discriminating section, wherein:

a crank rotor includes a plurality of tooth portions arranged at regular intervals, and first and second non-tooth portions asymmetrically positioned on a periphery of the crank rotor, the first non-tooth portion positioned to correspond to a top dead center of a specific cylinder of an engine;

a crank signal is outputted when the cylinder discriminating section detects each of the plurality of the tooth portions;

a cam signal is outputted when the cylinder discriminating section detects a predetermined tooth portion on a periphery of a cam rotor; and the cylinder discriminating section discriminates the specific cylinder by detecting the first non-tooth portion based on number of the crank signals detected during a time period from a time when one of the first and second non-tooth portions is detected to a time when the other of the first and second non-tooth portions is detected, and by detecting whether or not the cylinder discriminating section detects the cam signal during the same time period.

2. The cylinder discriminating device according to claim 1, wherein distances between each two tooth portions adjacent to the first and second non-tooth portions are different.

3. The cylinder discriminating section according to claim 2, wherein:

the distance between the two tooth portion adjacent to the first non-tooth portion is larger than the distance of the second non-tooth portion; and when one of the two adjacent tooth portions, which is located on downstream of the first non-tooth portion in a rotation direction of the crank rotor, the specific cylinder is located at the top dead center.

4. An engine ignition control device comprising:

the cylinder discriminating device of claim 1; and a fuel ignition control section that ignites the fuel in a cylinder discriminated by the cylinder discriminating device.

5. A cylinder discriminating device of an engine, the engine including:

a crank rotor including a plurality of tooth portions arranged at regular intervals, and first and second non-tooth portions asymmetrically positioned on a periphery of the crank rotor, wherein the first non-tooth portion is positioned to correspond to a top dead center of a specific cylinder; and a cam rotor including a tooth portion on a periphery of the cam rotor, which is positioned to correspond to a predetermined interval between the first and second non-tooth portions of the crank rotor, the cylinder discriminating device comprising:

a cylinder discriminating section that discriminates the specific cylinder by detecting the first non-tooth portion based on number of the tooth portions of the crank rotor detected by the cylinder discriminating section and by detecting whether or not the cylinder discriminating section detects the tooth portion of the cam rotor during a predetermined time period.

6. The cylinder discriminating device according to claim 5, wherein the predetermined time period is time period from a time when the cylinder discriminating section detects one of the first and second non-tooth portions to a time when the cylinder discriminating section detects the other of the first and second non-tooth portions.

7. A cylinder discriminating method comprising:

discriminating a specific cylinder of an engine, wherein: a crank rotor includes a plurality of tooth portions arranged at regular intervals, and first and second non-tooth portions asymmetrically positioned on a periphery of the crank rotor, the first non-tooth portion positioned to correspond to a top dead center of the specific cylinder;

a crank signal is outputted when the cylinder discriminating section detects each of the plurality of the tooth portions;

a cam signal is outputted when the cylinder discriminating section detects a predetermined tooth portion on a periphery of a cam rotor; and the specific cylinder is discriminated by detecting the first non-tooth portion based on number of the crank signals detected during a time period from a time when one of the first and second non-tooth portions is detected to a time when the other of the first and second non-tooth portions is detected, and by detecting whether or not the cylinder discriminating section detects the cam signal during the same time period.

8. The cylinder discriminating method according to claim 7, wherein distances between each two tooth portions adjacent to the first and second non-tooth portion are different.

9. The cylinder discriminating method according to claim 8, wherein:

the distance between the two tooth portion adjacent to the first non-tooth portion is larger than the distance of the second non-tooth portion; and when one of the two adjacent tooth portions, which is located on downstream of the first non-tooth portion in a rotation direction of the crank rotor, the specific cylinder is located at the top dead center.

10. An engine ignition control method comprising:

igniting fuel in the cylinder discriminated by the cylinder discriminating method of claim 7.

11. A cylinder discriminating method of an engine, the engine including:

a crank rotor including a plurality of tooth portions arranged at regular intervals, and first and second non-tooth portions asymmetrically positioned on a periphery of the crank rotor, wherein the first non-tooth portion is positioned to correspond to a top dead center of a specific cylinder; and a cam rotor including a tooth portion on a periphery of the cam rotor, which is positioned to correspond to a predetermined interval between the first and second non-tooth portions of the crank rotor, the cylinder discriminating method comprising:

discriminating the specific cylinder by detecting the first non-tooth portion based number of the tooth portions of the crank rotor detected and by detecting whether or not the cylinder discriminating section detects the cam signal during a predetermined time period.

12. The cylinder discriminating method according to claim 11, wherein the predetermined time period is time period from a time when the cylinder discriminating section detects one of the first and second non-tooth portions to a time when the cylinder discriminating section detects the other of the first and second non-tooth portions.

* * * * *